Nov. 17, 1936.    A. H. HEYROTH ET AL    2,061,357
THERMOCOUPLE AND METHOD OF MOUNTING THE SAME
Filed Dec. 27, 1933
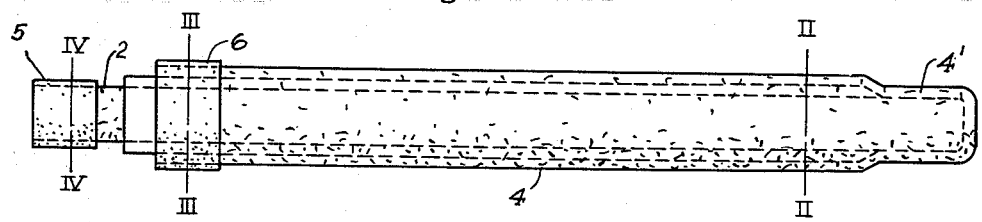
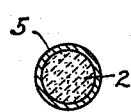
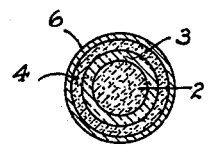
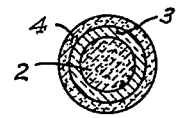
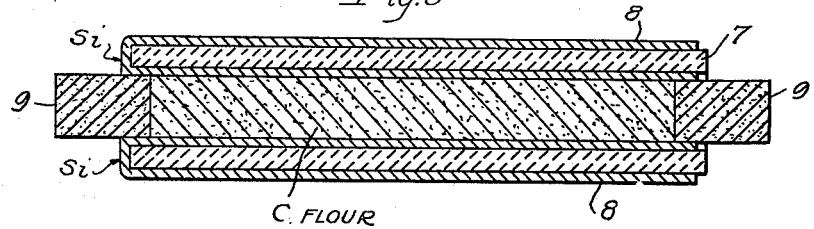
INVENTORS
ALBERT H. HEYROTH
EDWARD W. BRATTON
BY
ATTORNEY.

Patented Nov. 17, 1936

2,061,357

UNITED STATES PATENT OFFICE 2,061,357

THERMOCOUPLE AND METHOD OF MOUNTING THE SAME

Albert H. Heyroth, Niagara Falls, and Edward W. Bratton, Buffalo, N. Y., assignors to The Globar Corporation, Niagara Falls, N. Y., a corporation of New York Application December 27, 1933, Serial No. 704,140

5 Claims. (Cl. 136—5)

This invention relates to thermocouples and particularly to a thermocouple which yields a very large thermoelectric power as compared with thermocouples in which both of the elements are metallic.

Thermocouple elements are usually drawn out in the form of wires of different metals, the so-called hot junction being formed by brazing or welding ends of a pair of wires of two dissimilar metals. The opposite ends of the two wires are joined to leads (usually of copper) at the cold terminals which are kept at a constant temperature. The leads pass to a millivoltmeter or to a potentiometer for indications of the magnitude of the thermoelectromotive force set up when the temperature of the hot junction differs from that of the cold junction.

There are a number of disadvantages connected with the use of metal wires in the manner described. The electromotive force obtained with such thermocouples is very small for common metals. For example, in the case of iron and nickel when the cold terminals are at 0° C. and the hot junction is at 10° C. the electromotive force obtained is about 0.3 millivolt. This is considerably higher than is obtainable with pairs of most common metals. Again thermocouple wires are usually drawn fine or are used in considerable lengths to reduce conduction of heat from the hot junction toward the cold terminals. The dissimilar wires have to be carefully insulated from each other and are not rigid enough to contribute appreciably to their own support.

Some of the principal objects of my invention are therefore to produce a thermoelectric device which is compact, which contains a self-supporting element, and which possesses a very high thermoelectric power.

The construction of my thermoelectric device is illustrated by means of the accompanying drawing in which:

Figure 1 is a side view of my assembled thermocouple, broken lines being used to indicate interior construction;

Figure 2 is an enlarged section on the line II—II of Fig. 1;

Figure 3 is a similar section on the line III—III of Fig. 1;

Figure 4 is a similar section on the line IV—IV of Fig. 1;

Figure 5 is a sectional view illustrating a method of making a thermocouple from an originally homogeneous layer of silicon mounted on a tubular support, the section being taken through the axis of the tubular support.

Referring to the drawing in detail, the element 2 is a conducting rod of silicon carbide such as is sold under the trade name "Globar" for use in domestic heaters. Such a rod contains silicon carbide which is self-bonded by passing an electric current through the element, the current being sufficient to produce a temperature which will cause partial recrystallization of the silicon carbide. The process of making such a conducting rod of silicon carbide is described in the U. S. patent to Hediger, No. 1,906,853, issued May 2, 1933.

The silicon carbide element 2 is covered (except near the two ends) with an insulating slurry which can be made, for example, by painting the rod with a slurry made of bentonite clay and water to within a short distance of either end and baking the slurry and rod at a temperature of about 2300° F. An insulating glaze 3 is thus formed over the portion of the rod to which the bentonite slurry was applied. The coated rod is then dipped in a slurry of powdered silicon which covers the insulating coating to within a short distance of one end and also covers the exposed silicon carbide at the opposite end as indicated by the reference numeral 4' in Fig. 1. The silicon slurry is then dried and baked on the rod, giving the coating 4 which forms an element of the thermocouple. The end 4' is used as the hot junction of the thermocouple. A metal coating 5 is provided on the exposed end of the silicon carbide element by spraying on it a highly conducting metal such as brass, for example, with a Schoop gun. A similar coating 6 of sprayed metal is provided on the silicon layer as indicated at 6 in Fig. 1. These metal coatings 5 and 6 form the cold junction terminals for our thermocouple. Leads to a millivoltmeter or potentiometer can be attached and electrically connected to the metal terminals 5 and 6 respectively.

We have found that a thermocouple whose elements are respectively silicon carbide and silicon that a temperature difference of 600 degrees Fahrenheit between the hot and cold junctions gives an electromotive force of about 216 millivolts, while a temperature difference of 1220° Fahrenheit produces an electromotive force of 400 millivolts. These values are far in excess of the values obtained with two metallic elements.

A thermocouple can also be made by subjecting two connected portions of an originally homogeneous layer of silicon (mounted on the refractory base) to a heat treatment in which the surrounding conditions are different for the two portions of the layer. For example, a suitable ceramic tube is covered with a silicon slurry over its entire area, inside and outside, with the exception of a terminal area at one end of the tube which may be referred to as the open or uncoated end. After careful drying, the tube is filled with carbon flour held in place by loosely fitting a carbon stopper in each end of the tube and then firing the latter in an oxidizing atmosphere at about 2300° F. The coating on the inside of the tube becomes thermoelectrically different from the coating on the outside of the tube. The coated or electrically closed end of the tube becomes the hot junction while the cold terminals of the respective layers are situated at the opposite end of the tube. This method of making a thermocouple is illustrated in part in Figure 5. The refractory tube 7 is coated except at and near one end with a silicon slurry which is dried thereon and forms the coating 8 on the inside and outside of the tube as indicated in the drawing. The tube is then substantially filled with carbon flour and closed by means of the carbon stoppers 9. The assembly shown in Figure 5 is then placed in a furnace to which air can be admitted and baked at about 2300° Fahrenheit. After the heat treatment has been completed the stoppers 9 and the carbon flour are removed. The end of the coated tube shown at the left in Figure 5 is used as the hot junction of the thermocouple made in this manner. The cold ends of the thermocouple are the respective terminal portions of the inside and outside coatings as seen at the right in Figure 5. These terminal portions can be adapted for lead line connections by spraying in a manner similar to that used in forming the metal rings indicated at 5 and 6 in Figure 1.

Our method of making a thermocouple may be used in making thermocouples with other elements than those mentioned. For example, a carbon rod may be substituted for the silicon carbide rod 2.

As indicated above one of the principal advantages of our thermoelectric couple lies in its large thermoelectric power. Another advantages lies in the large area covered by the hot junction.

While the method of manufacture of our improved thermocouple may be modified in various ways, our invention is defined within the compass of the following claims:

We claim:

1. A thermoelectric couple comprised of a silicon carbide rod covered except at its two ends with a coating of insulating refractory, and a layer of finely divided silicon deposited over one end of the rod and over the insulating refractory to within a short distance from its opposite end.

2. The method of manufacture of a thermocouple which comprises covering a rod of conducting silicon carbide with a layer of insulating refractory except adjacent its two ends, and covering one end of the silicon carbide rod and the layer of insulating refractory with finely divided silicon except near the opposite end of the insulating layer, the layer being formed by application of a slurry of finely divided silicon and drying and baking the silicon coating on its support.

3. A thermoelectric couple comprising a first element consisting of a self-sustaining elongated member composed mainly of silicon carbide, an insulating coating extending along most of the length of said first element and consisting of a vitrified refractory, and a second element consisting of a layer of closely contacting silicon particles baked on one end of said first element to form a thermal junction and onto an extended area of the insulating refractory which separates the two elements except at said junction.

4. The method of making a thermoelectric couple of great thermoelectric power which comprises bonding small silicon carbide crystals into an elongated member by a recrystallization process to form a mechanically strong and electrically conducting element, applying to said element a slip of bentonite clay to form a coating except near its opposite ends, drying the slip and subsequently baking the rod and coating to over 2000° Fahrenheit, applying a slurry of finely divided silicon to one of the exposed silicon carbide ends, and to a portion of the insulating coating extending from the silicon-silicon carbide junction, and drying the silicon slurry and subsequently baking it to form a rigid coating.

5. A thermoelectric couple comprised of an elongated element of silicon carbide which is provided with a coating of insulating refractory extending along most of the length of said element, and a layer of finely divided silicon connected to one end of the silicon carbide element and thence extended over most of the length of the insulating coating, which coating separates the silicon carbide from the silicon except at said connected end.

ALBERT H. HEYROTH.
EDWARD W. BRATTON.